(12) United States Patent
Rideout et al.

(10) Patent No.: US 11,644,658 B2
(45) Date of Patent: May 9, 2023

(54) FLUID IMMERSION CONTROL FOR INVERTED MICROSCOPY

(71) Applicant: IDEX HEALTH AND SCIENCE LLC, Oak Harbor, WA (US)

(72) Inventors: Shane Alexander Rideout, Kirkland, WA (US); Jaime Javier Bravo, Anacortes, WA (US); Troy N. Sanders, Oak Harbor, WA (US)

(73) Assignee: IDEX HEALTH AND SCIENCE LLC, Oak Harbor, WA (US)

( * ) Notice: Subject to any disclaimer, the term of this patent is extended or adjusted under 35 U.S.C. 154(b) by 133 days.

(21) Appl. No.: 17/165,012

(22) Filed: Feb. 2, 2021

(65) Prior Publication Data

US 2021/0239960 A1 Aug. 5, 2021

Related U.S. Application Data

(60) Provisional application No. 62/969,809, filed on Feb. 4, 2020.

(51) Int. Cl.
*G02B 21/33* (2006.01)
*G05D 9/12* (2006.01)
*G02B 21/00* (2006.01)

(52) U.S. Cl.
CPC ......... *G02B 21/33* (2013.01); *G02B 21/0088* (2013.01); *G05D 9/12* (2013.01)

(58) Field of Classification Search
CPC ....... G02B 21/0088; G02B 21/33; G05D 9/12
See application file for complete search history.

(56) References Cited

U.S. PATENT DOCUMENTS

| | | | |
|---|---|---|---|
| 4,645,937 A * | 2/1987 | Atalar | G01S 17/46 73/624 |
| 7,304,793 B2 | 12/2007 | Hummel | |
| 7,619,829 B2 | 11/2009 | Okazaki et al. | |
| 8,199,407 B2 | 6/2012 | Liebel et al. | |
| 9,971,139 B2 | 5/2018 | Fujioka et al. | |
| 9,977,231 B2 | 5/2018 | Dougherty | |
| 11,216,017 B2 * | 1/2022 | Weiss | G02B 21/33 |
| 2010/0027109 A1 | 2/2010 | Liebel et al. | |
| 2017/0153437 A1 | 6/2017 | Dougherty | |
| 2020/0341259 A1 * | 10/2020 | Chan | G02B 21/06 |

OTHER PUBLICATIONS

International Application No. PCT/US2021/016162, International Search Report and Written Opinion dated Apr. 8, 2021, 7 pages.
PCT/US2021/016162 , "International Preliminary Report on Patentability", dated Aug. 18, 2022, 6 pages.

* cited by examiner

*Primary Examiner* — Hailey K. Do
(74) *Attorney, Agent, or Firm* — Kilpatrick Townsend & Stockton LLP

(57) ABSTRACT

A fluid immersion control system may use a common electrode along with a plurality of sensor electrodes at a planar surface associated with a distal end of an immersion microscope objective to monitor electrical resistance of a fluid as an indication of presence of a fluid layer having a meniscus greater than a diameter of an optical axis used for immersion microscopy. The fluid immersion control system may activate replenishment of the fluid when the resistance indicates that the diameter is not immersed in the fluid.

31 Claims, 12 Drawing Sheets

FLUID IMMERSION CONTROL FOR INVERTED MICROSCOPY

CROSS REFERENCE TO RELATED APPLICATION

This application claims priority under 35 U.S.C. § 119(e) to U.S. Provisional Application Ser. No. 62/969,809, filed on Feb. 4, 2020, which is incorporated herein by reference in its entirety for all purposes.

BACKGROUND

Field of the Disclosure

The present disclosure relates generally to inverted microscopy and, more particularly, to fluid immersion control for inverted microscopy.

Description of Related Art

Inverted microscopy refers to an arrangement of microscopy components and an optical path that is inverted or reversed from a typical benchtop microscope. Specifically, inverted microscopy involves the use of a sample stage or a sample table having a transparent bottom layer, below which a microscope objective is directed upwards in order to image a sample through the transparent bottom layer. In this manner, a plurality of samples, such as in a 1-dimensional or 2-dimensional array, may be placed on the sample stage and simultaneously introduced into an inverted microscope for imaging. The inverted microscope (or the sample stage) may be equipped with a motion control system, such as a dual-axis (or gantry) motion controller, for example, that enables each individual sample in the plurality of samples to be positioned for imaging above the microscope objective.

Because of the ability to simultaneously prepare and introduce a large plurality of samples, inverted microscopy has been used for in vitro diagnostics and other high-volume examinations of biological samples, and is suitable for both qualitative and quantitative analyses. Specifically, inverted microscopy has been useful for analyses related to gene sequencing, as well as high throughput imaging of biological samples, such as tissues, cell cultures, and biological fluids. The demand for biological analyses involving a higher spatial resolution or a longer imaging depth of field into living samples has led to the use of optical systems that are operated using a fluid medium in physical contact between the inverted microscope objective and a sample focal plane (e.g., at the transparent bottom layer of the sample stage). The fluid medium is selected for having a higher index of refraction than air, which increases the numerical aperture (NA) of the inverted microscope objective, thereby increasing the resolution of the inverted microscope as compared to imaging in air. Thus, such high NA optical systems depend upon the integrity of physical contact of the fluid medium between the inverted microscope objective and the sample focal plane for high throughput imaging.

An example of inverted microscopy is provided by U.S. Pat. No. 8,199,407 B2, issued on Jun. 12, 2012, entitled "Immersion Object, Apparatus for Forming an Immersion Film and Method," which is hereby incorporated by reference as if fully set forth herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
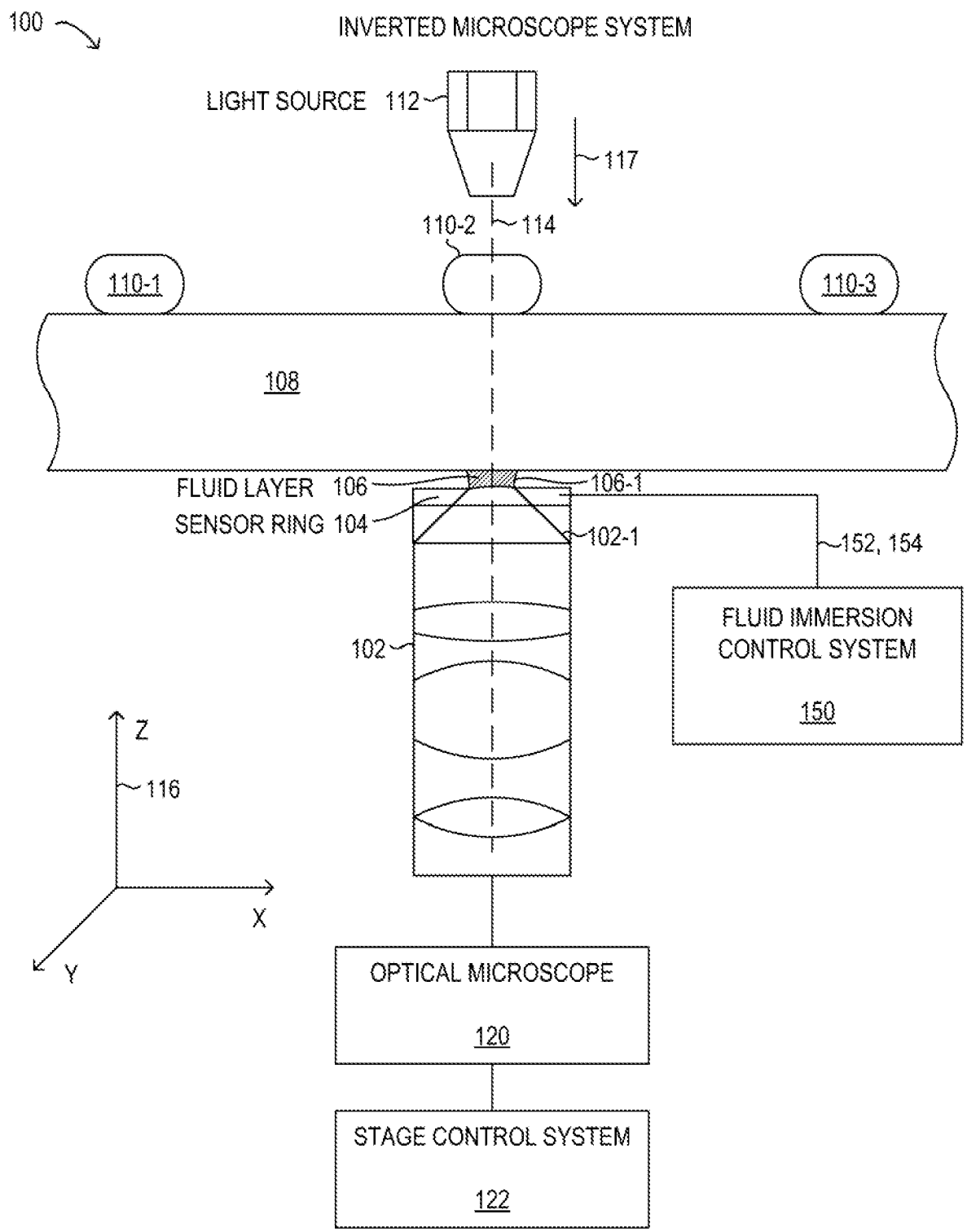
FIG. 1 depicts selected elements of an inverted microscope system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

As noted previously, the demand for biological analyses involving a higher spatial resolution or a longer imaging depth of field into living samples has led to the use of optical systems that are operated using a fluid medium in physical contact between an inverted microscope objective and a sample focal plane. For example, the sample focal plane may be at the transparent bottom layer of the sample stage, such as a glass slide used for performing in vitro diagnostics.

In various embodiments, a plurality of individual samples may be placed in a defined array, such as a well plate or a similar holder for a plurality of samples, having the transparent bottom layer, and may be individually scanned using the inverted microscope objective along with a motion control system. The motion control system may be enabled to move the samples with respect to the inverted microscope objective in order to view and image each individual sample. In some embodiments, the sample stage may move relative to the inverted microscope objective. In some embodiments, the samples stage may move relative to the inverted microscope objective. In still other embodiments, at least one of the sample stage and the inverted microscope objective may be moved relative to one another. In any case, the motion control system may perform individual movements to access individuals samples. For example, the movement from a first sample may involve an acceleration, a translation at a given velocity, and a deceleration to stop at a second sample. Furthermore, an individual movement may involve at least one change in direction. It is noted that other types of continuous motion profiles, such is without a constant velocity portion, may be used in various embodiments. Accordingly, during acceleration, translation, or deceleration when immersion microscopy is used, the fluid used for immersion may be lost or depleted. In particular, the fluid may retreat from a diameter of the optical axis as defined by the inverted microscope objective, such as a cross-sectional area of an optical portion of the inverted microscope objective (see also prior art FIG. 4). When the fluid does not entirely immerse the diameter of the optical axis, then the numerical aperture of the inverted microscope objective for the non-immersed portions is not increased, and the benefits of immersion microscopy cannot be realized.

As a result, when the fluid is lost during the movement, the fluid is replenished before immersion microscopy can be performed. In conventional systems, the detection of missing fluid and a corresponding refilling of the fluid may be performed once the microscope is stopped and is imaging a sample. Thus, the replenishment of the fluid in the imaging position may consume significant additional sampling time for each individual sample, which is undesirable and may adversely affect the overall economic efficiency (e.g., by constraining maximum sample throughput) of the entire microscopy system. In particular, for sample arrays having a large number of samples, the increased analysis time due the replenishment of the fluid in the imaging position may be substantial and significant. It is noted that the fluid may also be lost during operation due to other reasons, such as by evaporation, humidity levels, temperature or pressure changes, among other causes.

As disclosed herein, systems and methods for fluid immersion control for inverted microscopy are disclosed that are enabled to maintain the fluid over a diameter corresponding to the optical axis of the inverted microscope objective. The systems and methods for fluid immersion control for inverted microscopy provides a sensor ring in contact with the microscope objective body and forming an annulus through which the fluid may be replenished. A common electrode of the sensor ring may be located in the annulus where the common electrode remains in contact with the fluid, even when the fluid no longer completely immerses the diameter of the optical axis of the inverted microscope objective. In addition to the common electrode, the sensor ring includes a plurality of sensor electrodes that are arranged circumferentially about the diameter of the optical axis. In particular embodiments, eight sensor electrodes may be arranged in a circle slightly larger than the diameter of the optical axis and may be enabled to detect any partial depletion of the fluid over the diameter.

Furthermore, the systems and methods for fluid immersion control for inverted microscopy disclosed herein may provide a sensor ring that forms a substantially planar surface when attached to the inverted microscope objective, such that the sensor electrodes and a distal end of the inverted microscope objective are at the planar surface to which one surface of the meniscus of the immersion fluid attaches. As a result of the co-planar arrangement, it is noted that signals from the sensor electrodes can reliably detect the fluid or any partial absence of the fluid, without any geometric complications that may affect where the fluid contacts the microscope.

The systems and methods for fluid immersion control for inverted microscopy disclosed herein may provide a fluid immersion control system that can regulate an amount of the fluid used for immersion. Specifically, the fluid immersion control system may continuously measure a resistance of the fluid, such as during a movement to a different sample, as described above, from each of the sensor electrodes simultaneously. In this manner, the systems and methods for fluid immersion control for inverted microscopy disclosed herein may provide a high sensitivity to conditions where the fluid is depleted or partially depleted from the diameter of the optical axis. The high sensitivity may be a sensitivity to fluid level changes as well as a sensitivity to a time of depletion and replenishment. Thus, the systems and methods for fluid immersion control for inverted microscopy disclosed herein may enable rapid detection of even at least partially depleted fluid levels, such as during a scanning motion, and may be enabled to rapidly respond and replenish the fluid in time for the next sample, such that by the time the inverted microscope objective stops at the next sample, immersion microscopy imaging can be immediately performed without delay.

Referring now to the drawings, FIG. 1 depicts an inverted microscope system 100 for performing immersion microscopy. It is noted that inverted microscope system 100 is depicted schematically in FIG. 1 and may not be not drawn to scale or perspective. In particular, it is noted that various different elements and components than shown in FIG. 1 may be used in different implementations of inverted microscope system 100.

As shown in FIG. 1, inverted microscope system 100 uses a fluid layer 106 between an inverted microscope objective 102 and a sample plate 108. Fluid layer 106 may form a meniscus 106-1 between a planar surface of a sensor ring 104 that is mounted to a distal end of inverted microscope objective 102. It is noted that various types of fluids or mixtures of fluids may be used for fluid layer 106, and that a working distance between sensor ring 104 and sample plate 108 may be governed by certain physical properties of fluid layer 106, such as a surface tension of fluid layer 106 (see also FIG. 11). In particular embodiments, fluid layer 106 has a higher index of refraction than air. In one embodiment, fluid layer 106 comprises deionized water. Although sample plate 108 is shown as a unitary structure, it is noted that sample plate 108 itself may be a singular element of a plurality of elements, such as a single glass slide of a plurality of glass slides that can be loaded for imaging, either singularly or collectively.

In FIG. 1, coordinate axes 116 defines orientations of an X-Y plane that is parallel with sample plate 108 and perpendicular to a Z axis that is parallel with an optical axis 114. As shown, optical axis 114 represents an optical axis of inverted microscope objective 102 that extends across a first diameter (not visible in FIG. 1, see FIG. 6, diameter 906 in FIG. 9) at a distal portion 102-1 of inverted microscope objective 102. In particular, light passes in a direction 117 (corresponding to the Z axis of coordinate axes 116) along optical axis 114 into inverted microscope objective 102. As shown, a light source 112 is used to illuminate a plurality of samples 110 that are located on sample plate 108 in direction 117. Samples 110 are schematic illustrations and may correspond to any kind of liquid, solid, or mixture subject to imaging using inverted microscope objective 102, including biological samples including different cell structures and chemical species, for example. In FIG. 1, a second sample 110-2 is subject to illumination from light source 112, while a first sample 110-1 and a third sample 110-3 are adjacent to second sample 110-2, representing an array of samples carried by sample plate 108. Although light source 112 will typically be enabled to output visible light frequencies, it is noted that light source may generate various frequencies of light and may generate coherent or incoherent light. Accordingly, sample plate 108 may be comprised of a material that is transparent to at least some of the light frequencies generated by light source 112, such as a glass or a transparent polymer. It is noted that sample plate 108 and samples 110 may represent various structures and carriers for a plurality of samples, such as a well plate or another type of carrier enabled to hold and image the samples using inverted microscope system 100.

In the schematic illustration of FIG. 1, optical axis 114 continues through inverted microscope objective 102 and into an optical microscope 120, which may represent various different kinds and arrangements of optical microscopes, or components of optical microscopes, that enable imaging, including quantitative and qualitative analysis. Also shown in FIG. 1 is a stage control system 122 that may represent various components of a motion control system enabled to move at least one of sample plate 108 and inverted microscope objective 102 with each other, as described previously, for example, to analyze a plurality of samples 110.

Also shown in FIG. 1 is a fluid immersion control system 150, which will be described in further detail below, and which may include, or may be enabled to support operation of sensor ring 104. Also labeled in FIG. 1 are a fluid interface 154 and an electronic interface 152 of fluid immersion control system 150 to sensor ring 104. Fluid interface 154 may represent a conduit in fluid communication with sensor ring 104 for replenishing fluid layer 106, while electronic interface 152 may represent electrical connections to the common electrode and the sensor electrodes included with sensor ring 104. Further details of fluid immersion control system 150 are described below with respect to FIG. 2.

In operation of inverted microscope system 100, sample plate 108 and the plurality of samples 110 may be introduced for imaging analysis. Stage control system 122 may operate to translate inverted microscope objective 102 in the X-Y plane relative to sample plate 108 in order to image individual samples 110, such as shown for sample 110-2. Furthermore, fluid immersion control system 150 may be activated and may automatically introduce and maintain fluid layer 106 between distal portion 102-1 of inverted microscope objective 102 and sample plate 108, including when in motion. Thus, fluid immersion control system 150 may ensure that immersion microscopy can be performed using inverted microscope objective 102 at any desired time and without significant time constraints, or constraints associated with the motion controlled by stage control system 122. In this manner, inverted microscope system 100, as shown and described above, may enable improved efficiency and greater productivity for inverted immersion imaging.

Figure 2:
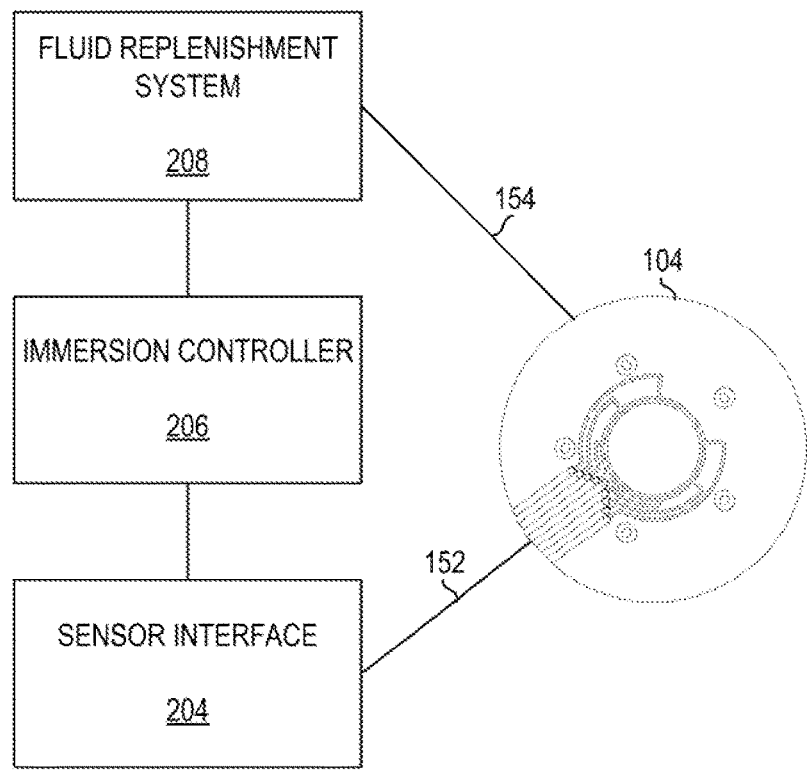
FIG. 2 depicts selected elements of a fluid immersion control system.

Referring now to FIG. 2, further details of fluid immersion control system 150 are depicted in a schematic diagram. Accordingly, FIG. 2 may not be not drawn to scale or perspective. In FIG. 2, fluid immersion control system 150 is shown comprising a sensor interface 204, an immersion controller 206, and a fluid replenishment system 208. Specifically, sensor interface 204 is coupled to sensor ring 104 via electronic interface 152, which may comprise a plurality of signal wires or other connectors to enable a measurement circuit 300 (see FIG. 3) to be closed. Also, fluid replenishment system 208 is coupled to sensor ring 104 via fluid interface 154, which may be a conduit that couples to sensor ring 104 and is in fluid communication with internal pathways in sensor ring 104, as described in further detail below with respect to FIGS. 9 and 10, for example.

As shown in FIG. 2, immersion controller 206 may provide processing and logic functionality to interpret measurement signals and generate actuator signals accordingly. Accordingly, immersion controller 206 may internally comprise a processor and memory media enabled to store and provide executable code to the processor, along with other circuits and components. In some embodiments, immersion controller 206 may include a field-programmable gate array that implements at least some of the logic functionality for fluid immersion control system 150. In particular embodiments, immersion controller 206 may be an embedded controller that is enabled to operate autonomously and without user input, such as in a dedicated automated manner. It will also be understood that fluid immersion control system 150 may rely upon at least one electrical power source (not shown) that can be an external power source or an internal power source to the elements depicted in FIG. 2.

In fluid immersion control system 150 as shown in FIG. 2, sensor interface 204 may implement and use measurement circuit 300 (see FIG. 3) to perform resistance measurements of fluid layer 106 used for immersion microscopy, as described in detail with respect to FIG. 1. Accordingly, sensor interface 204 may provide an electrical source, such as a voltage source or a current source 302 (see FIG. 3) to power measurement circuit 300. It is noted that the electrical source may be operated in direct current mode or in alternating current mode in various embodiments. Additionally, sensor interface 204 may provide signal conditioning, amplification, and digitization for input signals from measurement circuit 300. Various means and method for signal conditioning, amplification, and digitization may be used in different embodiments. For example, when a single analog-to-digital converter (ADC, not shown) is used with sensor interface 204, sensor interface 204 may include a multiplexer (not shown) to sequentially switch and digitize a respective plurality of input signals, such as from sensor electrodes 306 and a common electrode 304 (see FIG. 3). In other embodiments, a plurality of ADCs may be included with sensor interface 204 corresponding to each of the respective plurality of input signals. In various embodiments, sensor interface 204 may have a corresponding digital interface with immersion controller 206 and may send measurement values or other indications of the results of measurements performed to immersion controller 206. The results of the measurements may indicate whether an amount of fluid in fluid layer 106 is sufficient for immersion microscopy or not.

In fluid immersion control system 150 as shown in FIG. 2, immersion controller 206 may correspondingly receive the measurement results from sensor interface 204 and may made a decision whether or not to actuate fluid replenishment system 208 to refill fluid to sensor ring 104. In some embodiments, immersion controller 206 may have direct control of fluid replenishment at all times and may directly control the flow of fluid through fluid interface 154. In some embodiments, fluid replenishment system 208 may have some degree of control, such as by enabling fluid to flow through fluid interface 154 for a certain duration in response to a single indication from immersion controller 206.

In fluid immersion control system 150 as shown in FIG. 2, fluid replenishment system 208 may include various components to provide the fluid through fluid interface 154 in response to an indication from immersion controller 206. Accordingly, fluid replenishment system 208 may comprise a tank or reservoir (not shown) for a certain volume of the fluid. The internal reservoir of fluid replenishment system 208 may be in fluid communication with a pump (not shown) that is, in turn, in fluid communication with fluid interface 154 to output the fluid.

Figure 3:
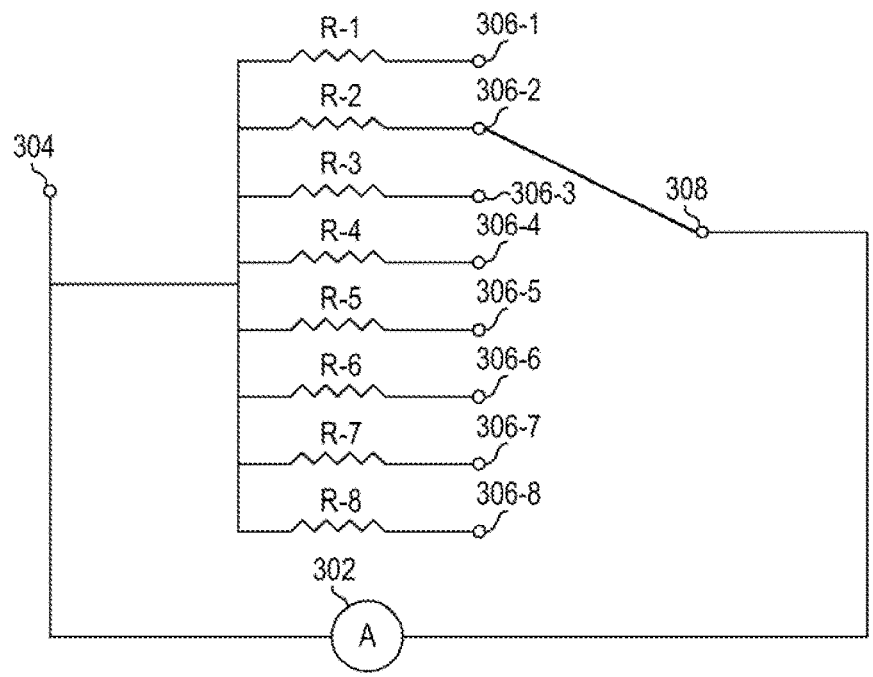
FIG. 3 depicts selected elements of a measurement circuit.

In FIG. 3, measurement circuit 300, as referred to previously, is depicted. As shown, measurement circuit is used for resistance measurements of fluid layer 106 between respective sensor electrodes 306 and common electrode 304, and further comprises a current source 302 and a switch 308. Each sensor electrode 306 may be formed as an external surface electrode at a working surface of sensor ring 104, as will be shown and described in further detail below. Sensor electrodes may be shaped in an arc form and may be placed circumferentially about diameter 906 (see FIG. 9) of optical axis 114 of inverted microscope objective 102. As shown in measurement circuit 300, the resistors R-1, R-2, R-3, R-4, R-5, R-6, R-7, and R-8 correspond to resistances of fluid layer 106 respectively measured by eight sensor electrodes 306. Resistance R-1 is measured by sensor electrode 306-1, resistance R-2 is measured by sensor electrode 306-2, resistance R-3 is measured by sensor electrode 306-3, resistance R-4 is measured by sensor electrode 306-4, resistance R-5 is measured by sensor electrode 306-5, resistance R-6 is measured by sensor electrode 306-6, resistance R-7 is measured by sensor electrode 306-7, and resistance R-8 is measured by sensor electrode 306-8. A switch 308 is shown enabling individual connection to sensor electrodes 306 and is shown in a position where sensor electrode 306-2 is switched in measurement circuit 300 to measure resistance R-2, in an exemplary state. It is noted that other means of individually measuring the resistance of sensor electrodes 306 may be used in different embodiments. Although current source 302 is shown corresponding to voltage measurements (not shown) at sensor electrodes 306-2 for measuring resistance, it will be understood that other arrangements for resistance measurement may be used, such as a voltage source and a current measurement.

In operation of measurement circuit 300, each electrode 306 may be respectively switched for measurement using switch 308, for example. When resistance values from all electrodes 306 indicates presence of the fluid, measurement circuit 300 may continue to monitor. When resistance values from at least one electrode 306 indicates absence of the fluid, measurement circuit 300 may indicate that fluid is to be replenished.

Figure 4:
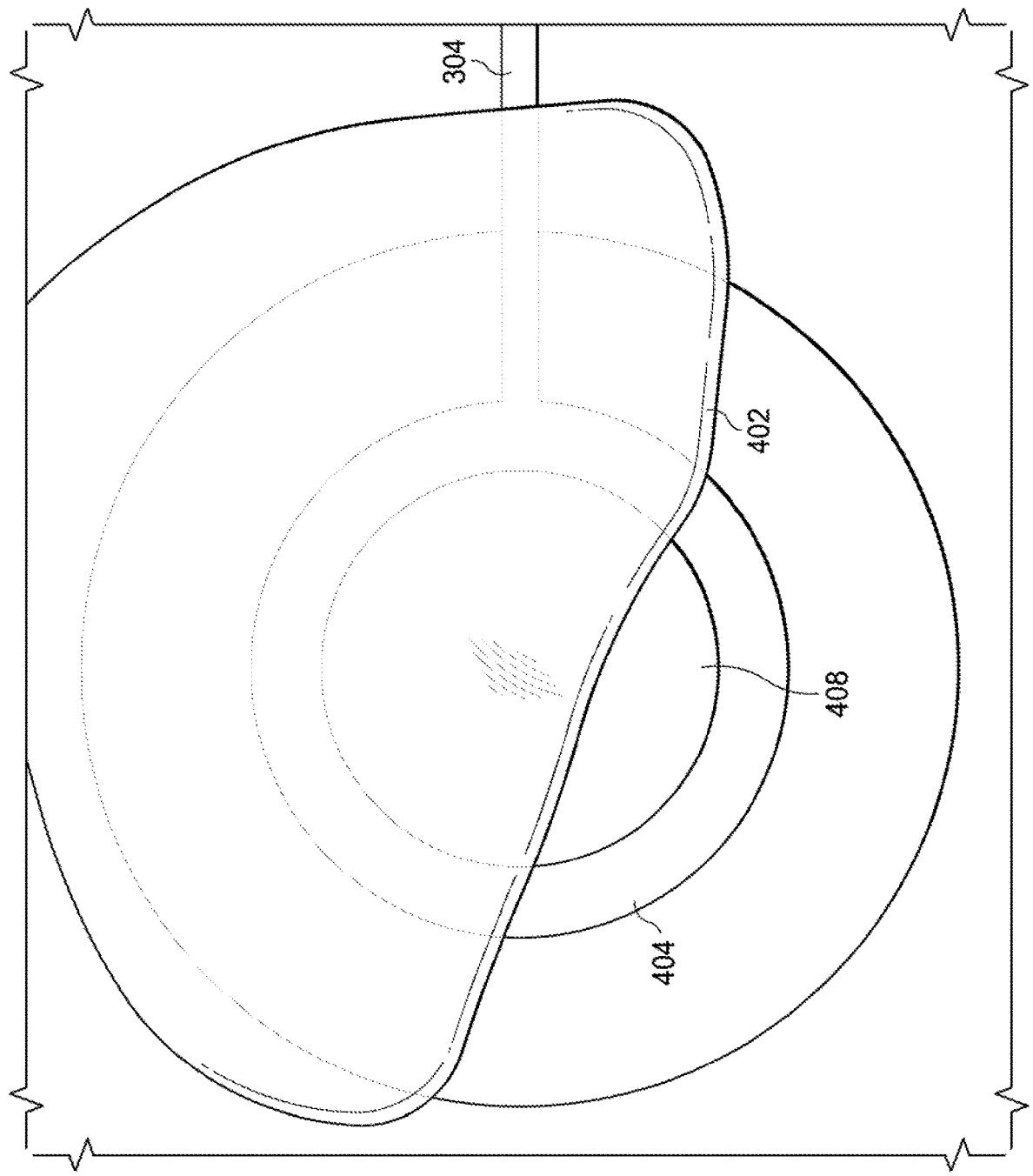
FIG. 4 depicts a prior art inverted microscope objective in motion.

Referring now to FIG. 4, a prior art depiction of an inverted microscope objective 408 is shown during motion from above through a transparent sample plate (not visible in FIG. 4). Visible in FIG. 4 is a spacer ring 404 that shows diameter 906 of the optical axis of inverted microscope objective 408. As inverted microscope objective 408 is moved, such as from a first sample to a second sample as described above, a meniscus 402 of a fluid layer used for immersion microscopy is shown dynamically receding and no longer covers spacer ring 404, which is not suitable for inverted microscopic imaging using inverted microscope objective 408.

Figure 5:
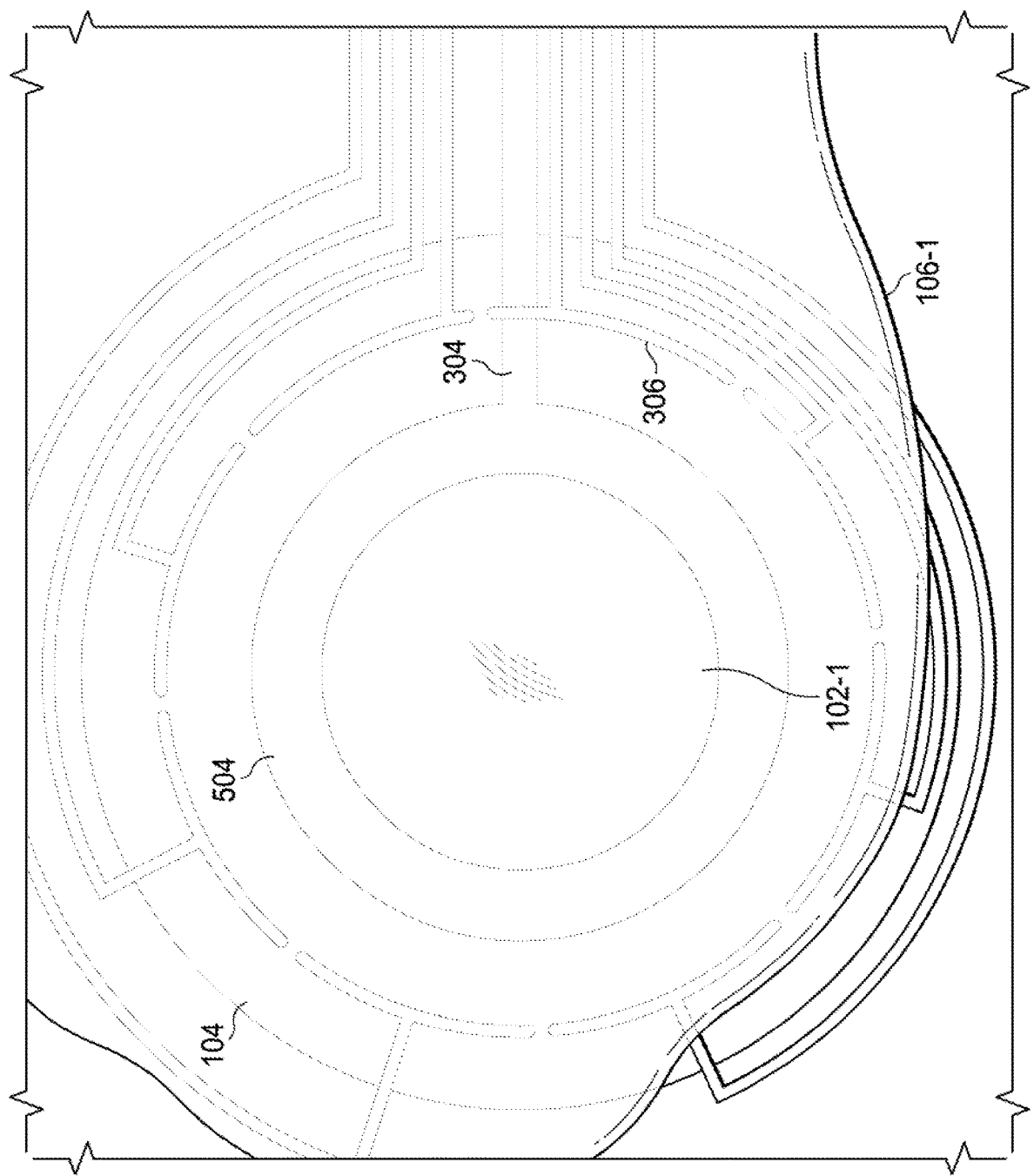
FIG. 5 depicts an inverted microscope objective with immersion fluid control in motion.

In FIG. 5, a similar depiction as in FIG. 4 is shown but with the elements of inverted microscope system 100, as described herein for fluid immersion control, including inverted microscope objective 102, sensor electrodes 306, and sensor ring 104. Visible in FIG. 5 is a ring 504 that shows diameter 906 (see FIG. 9) of the optical axis of inverted microscope objective 102. In FIG. 5, as inverted microscope objective 102 is moved, as a result of the operation of fluid immersion control system 150, meniscus 106-1 is maintained over ring 504 with a larger diameter than ring 504, which enables immersion microscopy without interruption or time constraints or motion constraints.

Figure 6:
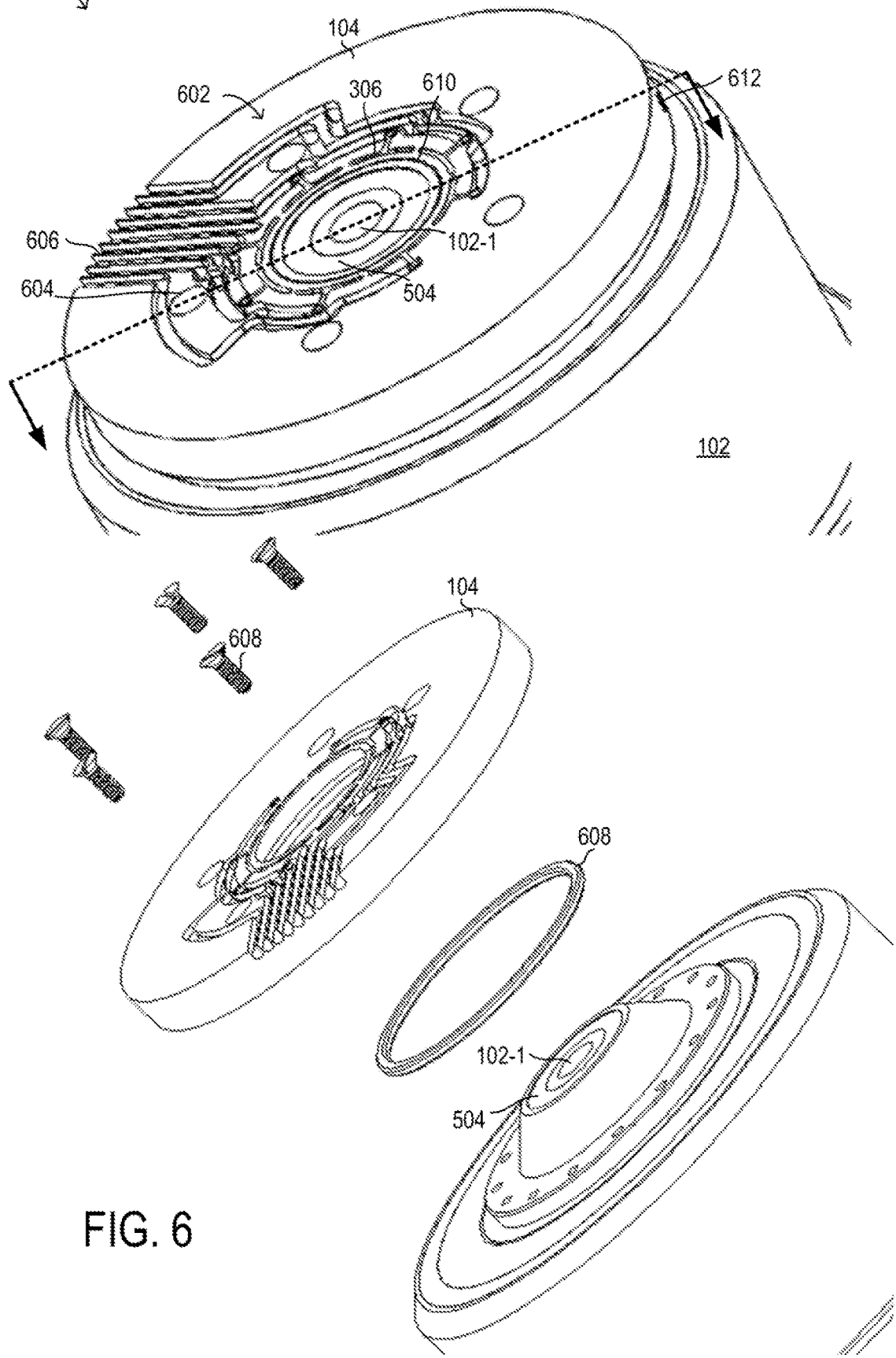
FIG. 6 depicts details of a sensor ring mounted to a microscope objective.

Advancing now to FIG. 6, an assembly 600 of sensor ring 104 with inverted microscope objective 102 is shown assembled above in a perspective view and below in an exploded view. In FIG. 6, sectional line 900 defines a sectional view presented below with respect to FIGS. 9 and 10. In the perspective view of FIG. 6 as assembled, a surface 602 of sensor ring 104 is visible that forms a working surface of inverted microscope objective 102 for immersion microscopy when sensor ring 104 is assembled with inverted microscope objective 102, as shown. Common surface 602 is shown being substantially planar and accordingly may promote stable formation of meniscus 106-1. Also visible in assembly 600 are grooves 606 formed to carry signal traces for respective signal electrodes 306 at surface 602. At least one mounting hole 604 may be penetrated by at least one screw 608 to attach sensor ring 104 to inverted microscope objective 102. As shown in FIG. 6, five screws 608 are used with five mounting holes 604. Visible in the exploded view is sealing ring 608 that may seal an annulus 610 that is formed when sensor ring 104 is assembled with inverted microscope objective 102, as well as fluid port 612 at a radial edge of sensor ring 104, as shown. Annulus 610 is in fluid communication with fluid port 612 to provide the fluid for fluid layer 106 (not shown in FIG. 6), as described herein.

Figure 7:
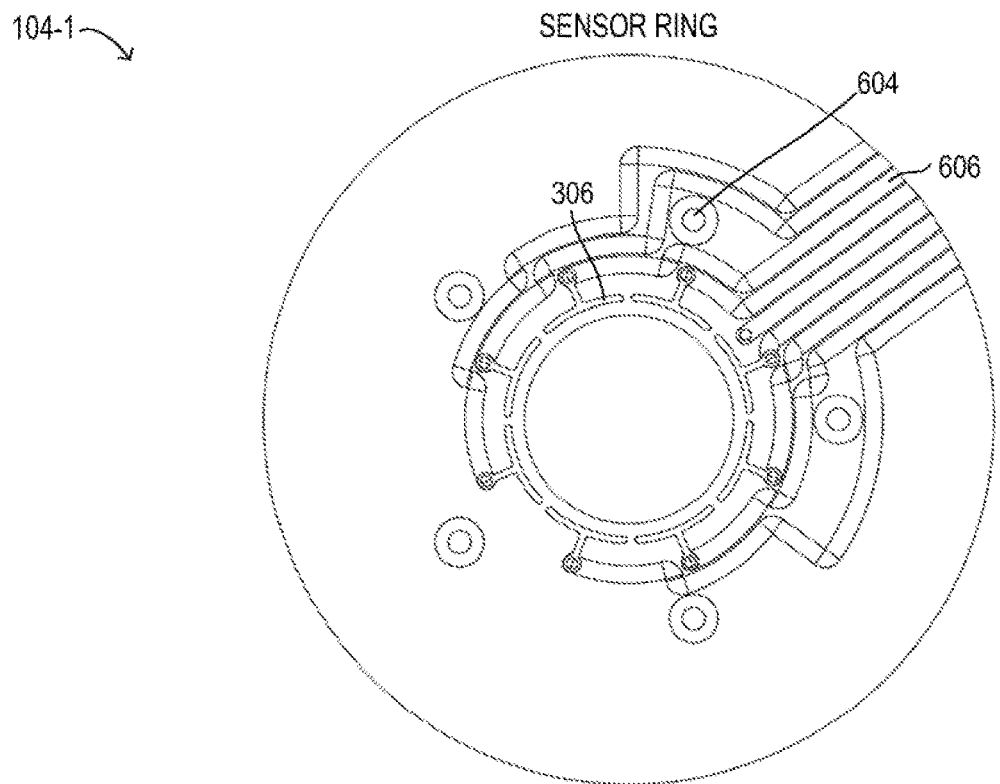
FIG. 7 depicts a top view of a sensor ring in detail.
Figure 8:
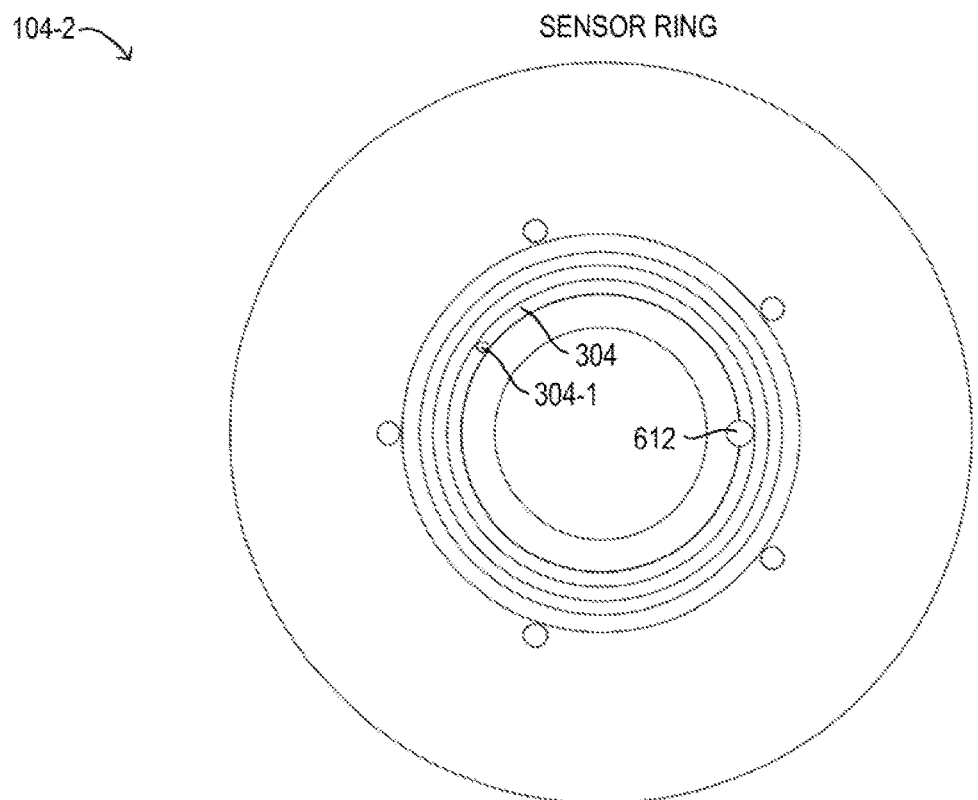
FIG. 8 depicts a bottom view of a sensor ring in detail.

FIGS. 7 and 8 respectively depict a top view 104-1 and a bottom view 104-2 of sensor ring 104. In top view 104-1, various elements of sensor ring 104 are visible, including sensor electrodes 306, through hole 604, and grooves 606. In bottom view 104-2, the surfaces of sensor ring 104 that form annulus 610 are visible and include common electrode 304 formed as a ring within annulus 610 so as to remain in contact with the fluid at all times, and including a connector lead 304-1 for connection via electrical interface 152. Also visible in bottom view 104-2 is fluid port 612 that terminates within annulus 610 to replenish fluid for connection with fluid interface 154.

Figure 9:
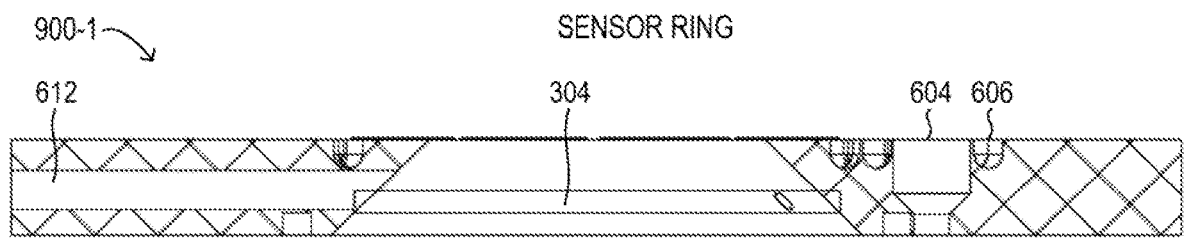
FIG. 9 depicts further details in a sectional view of a sensor ring.
Figure 10:
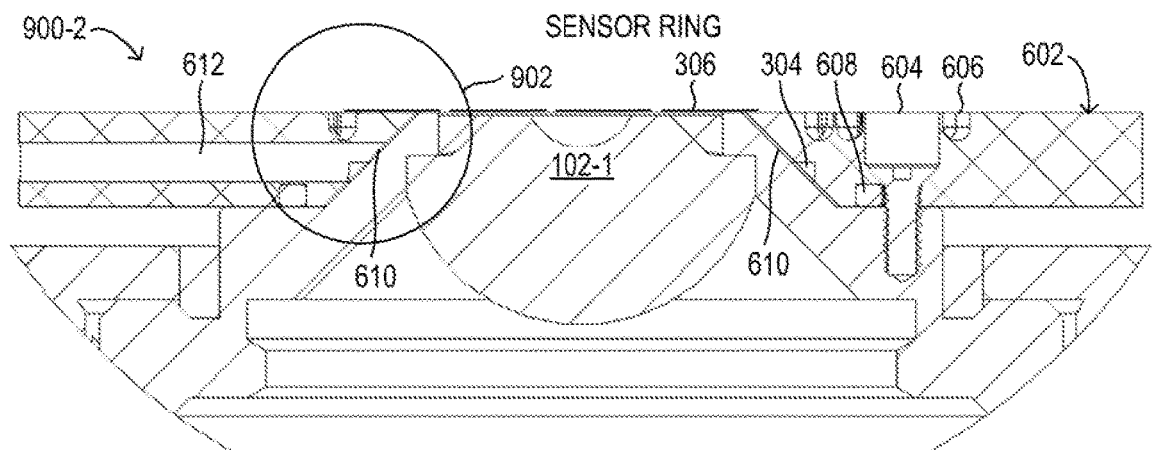
FIG. 10 depicts further details in a sectional view of a sensor ring mounted to a microscope objective.
Figure 10:
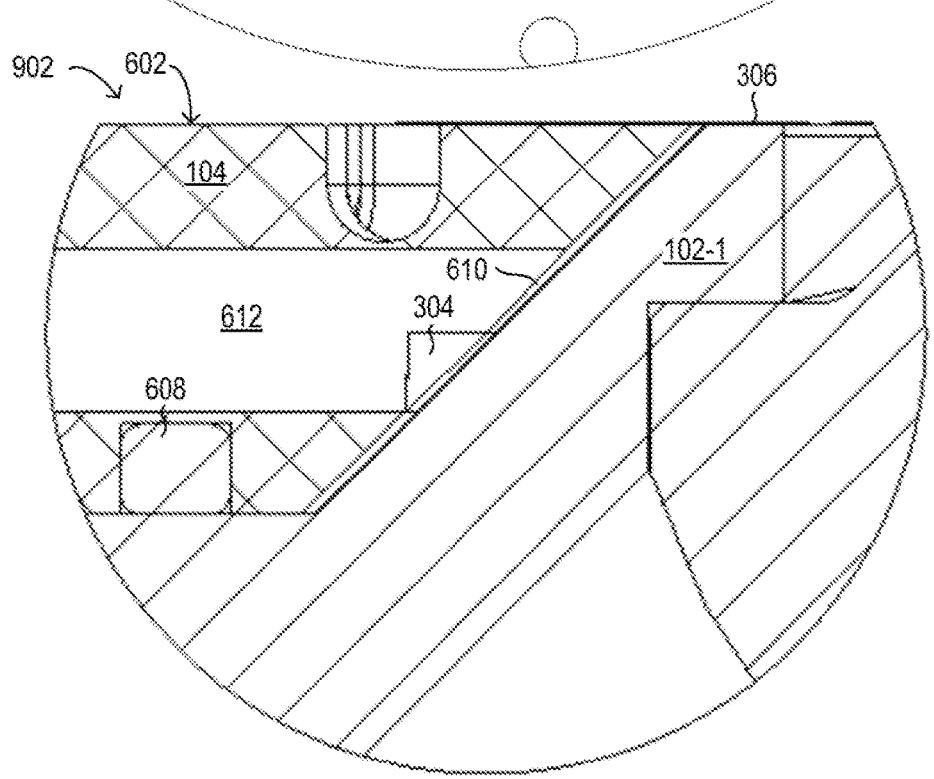

FIGS. 9 and 10 respectively depict two versions 900-1, 900-2 of sectional view 900 of sensor ring 104. In FIG. 9, sectional view 900-1 depicts sensor ring 104 alone, while in FIG. 10, sectional view 900-2 depicts sensor ring 104 assembled with distal portion 102-1 of inverted microscope objective 102 (corresponding to assembly 600, see FIG. 6). In sectional views 900-1 and 900-2, various elements of sensor ring 104 are visible, including sensor electrodes 306, through hole 604, grooves 606, common electrode 304, and fluid port 612. In sectional view 900-2 of FIG. 10, an enlarged portion 902 is shown below providing further details of fluid port 612 and annulus 610.

Figure 11:
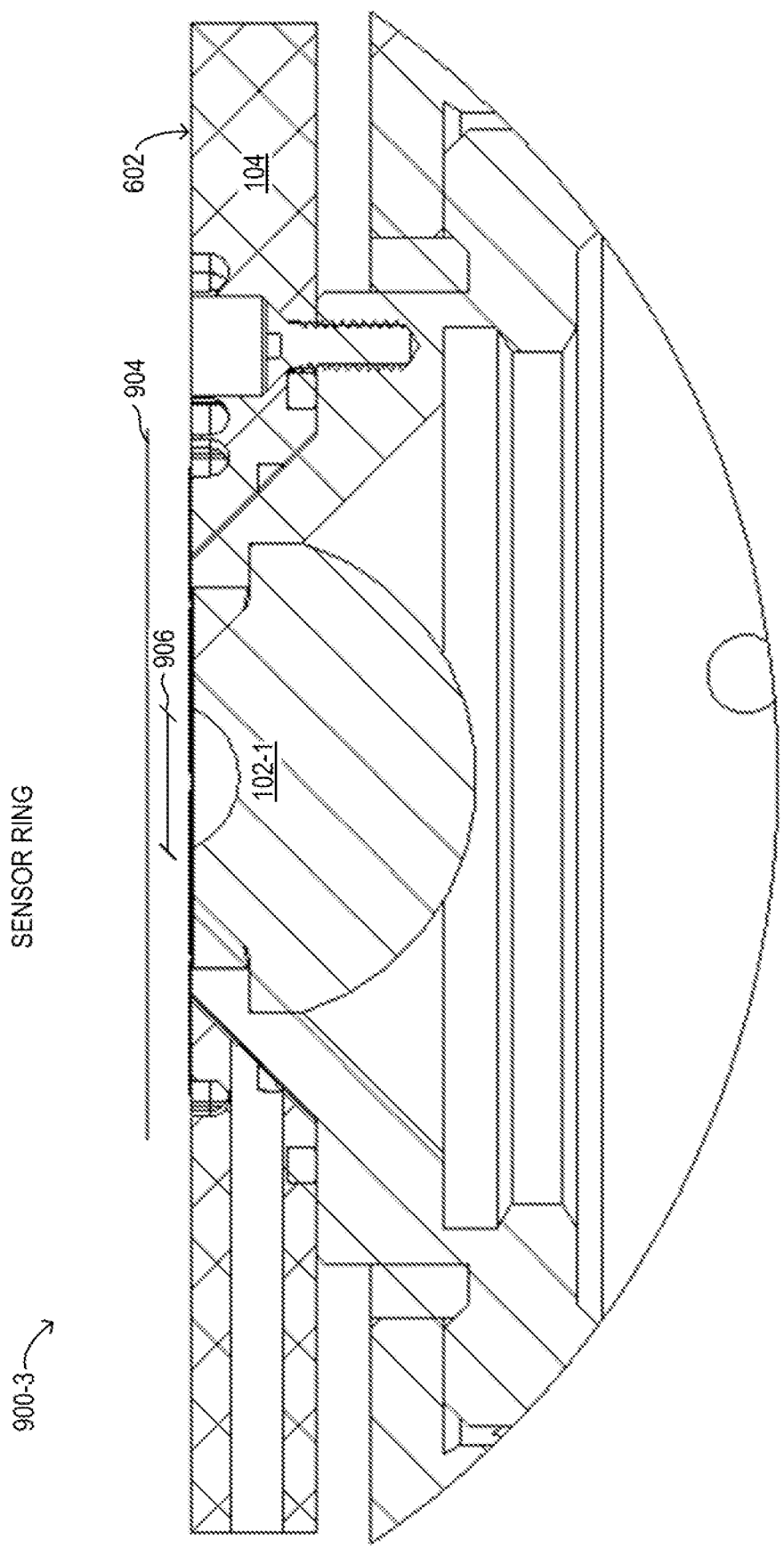
FIG. 11 depicts a working distance in a sectional view of a sensor ring mounted to a microscope objective.

In FIG. 11, a sectional view 900-3 of sensor ring 104 assembled to distal portion 102-1 of inverted microscope objective 102 is shown that is substantially similar to sectional view 900-2 shown in FIG. 10. However, in sectional view 900-3, a line 904 represents a working distance for inverted microscope objective 102, such as a focal range of inverted microscope objective 102. Accordingly, a distance between surface 602 and line 904, relative to a size of sensor ring 104, may represent a working thickness of fluid layer 106 that is maintained during immersion microscopy, as disclosed herein. Furthermore, the diameter 906 of the optical axis of inverted microscope objective 102 is also depicted in FIG. 11.

Figure 12:
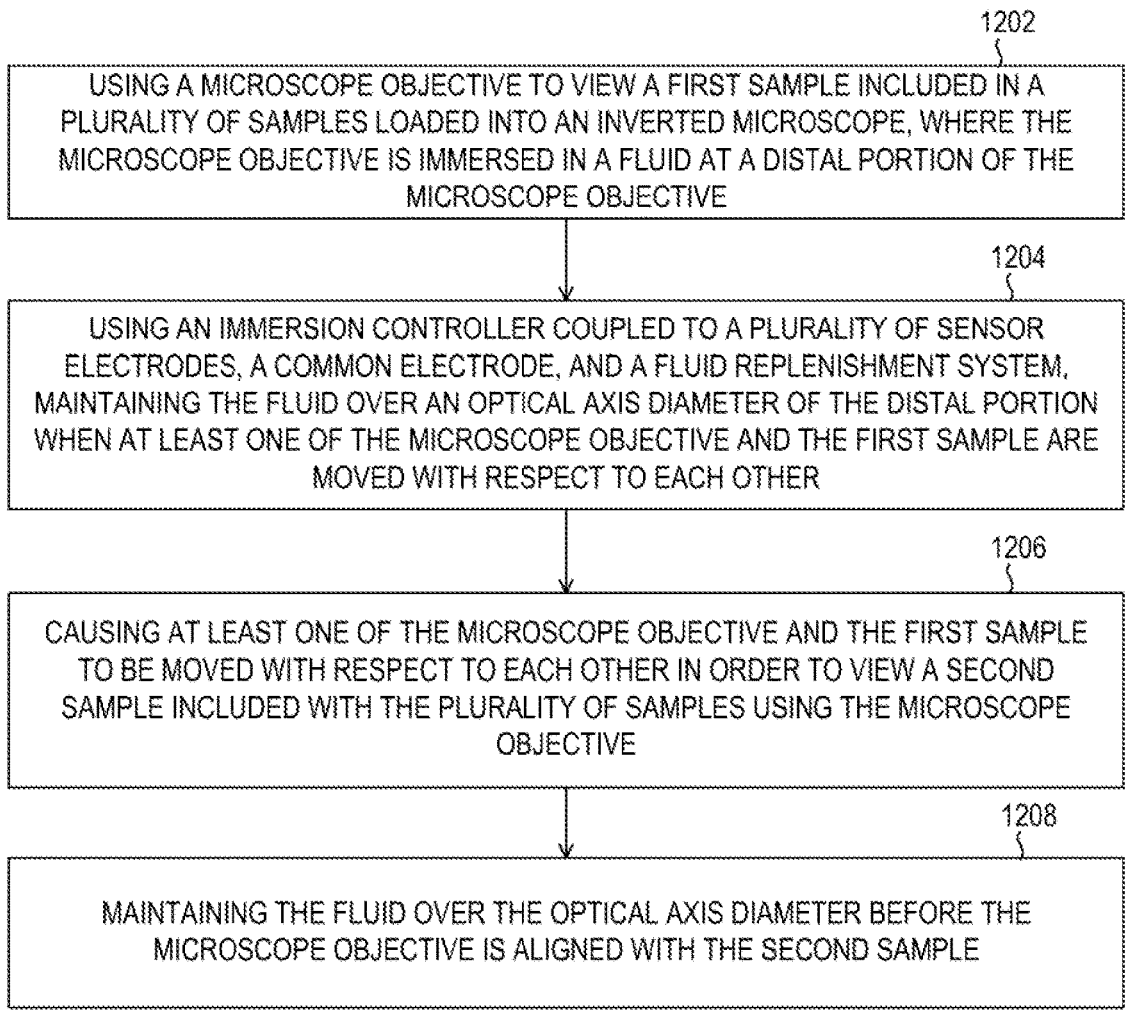
FIG. 12 is a flow chart of a method of inverted immersion microscopy.

Referring now to FIG. 12, a flowchart of selected elements of an embodiment of method 1200 of fluid immersion control with inverted immersion microscopy, as described herein, is depicted. Method 1200 may be performed using fluid immersion control system 150 with sensor ring 104, as described above. It is noted that certain operations described in method 1200 may be optional or may be rearranged in different embodiments.

Method 1200 may begin at step 1202 by using a microscope objective to view a first sample included in a plurality of samples loaded into an inverted microscope, where the microscope objective is immersed in a fluid at a distal portion of the microscope objective. At step 1204, an immersion controller coupled to a plurality of sensor electrodes, a common electrode, and a fluid replenishment system is used to maintain the fluid over an optical axis diameter of the distal portion when at least one of the microscope objective and the first sample are moved with respect to each other. At step 1206, at least one of the microscope objective and the first sample is caused to be moved with respect to each other in order to view a second sample included with the plurality of samples using the microscope objective. At step 1208, the fluid is maintained over the optical axis diameter before the microscope objective is aligned with the second sample.

Figure 15:
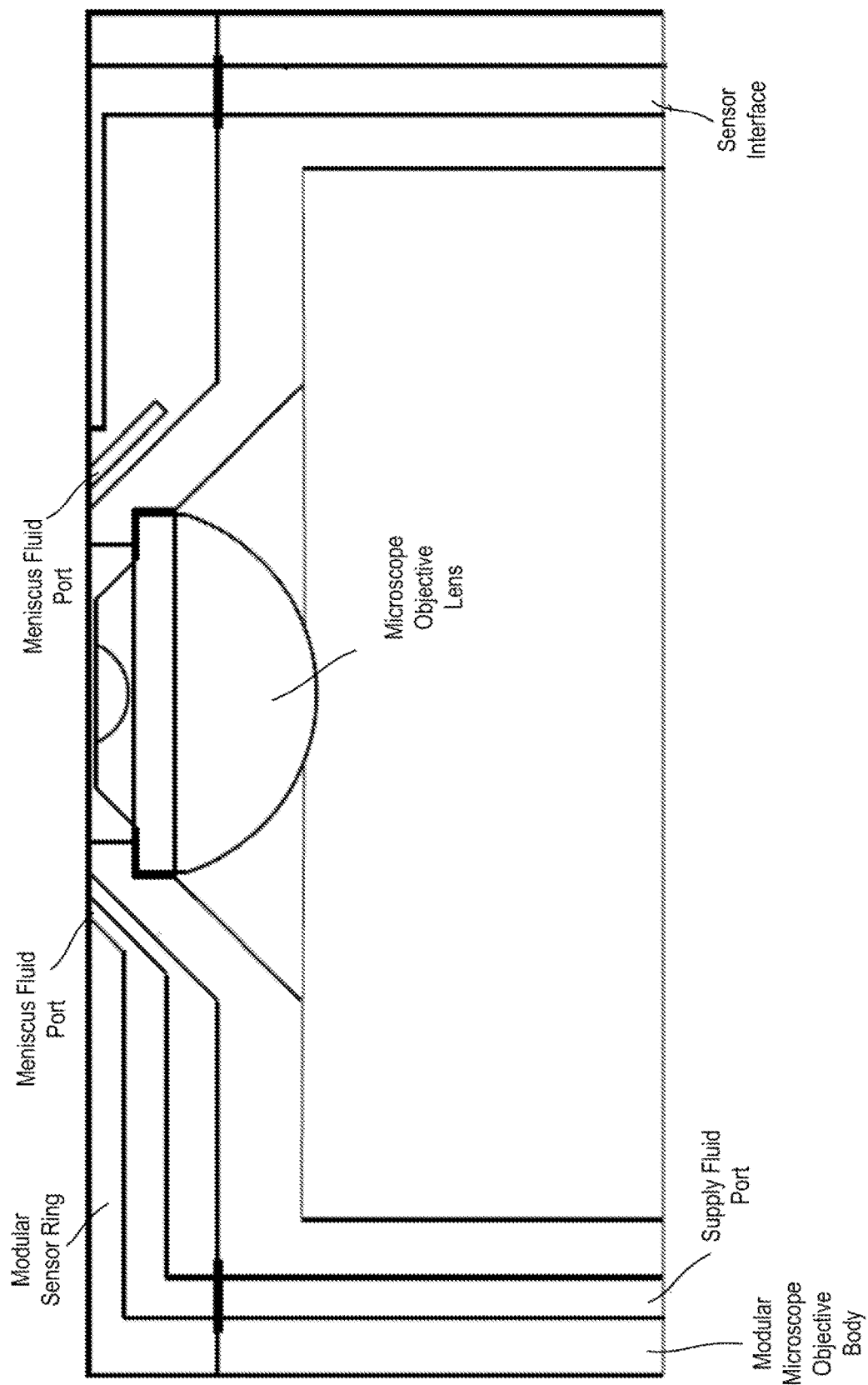
FIG. 15 depicts yet another embodiment in which a sensor ring is attached to a microscope objective body.

FIG. 15 depicts yet another embodiment in which a sensor ring is attached to a microscope objective body.

Figure 13:
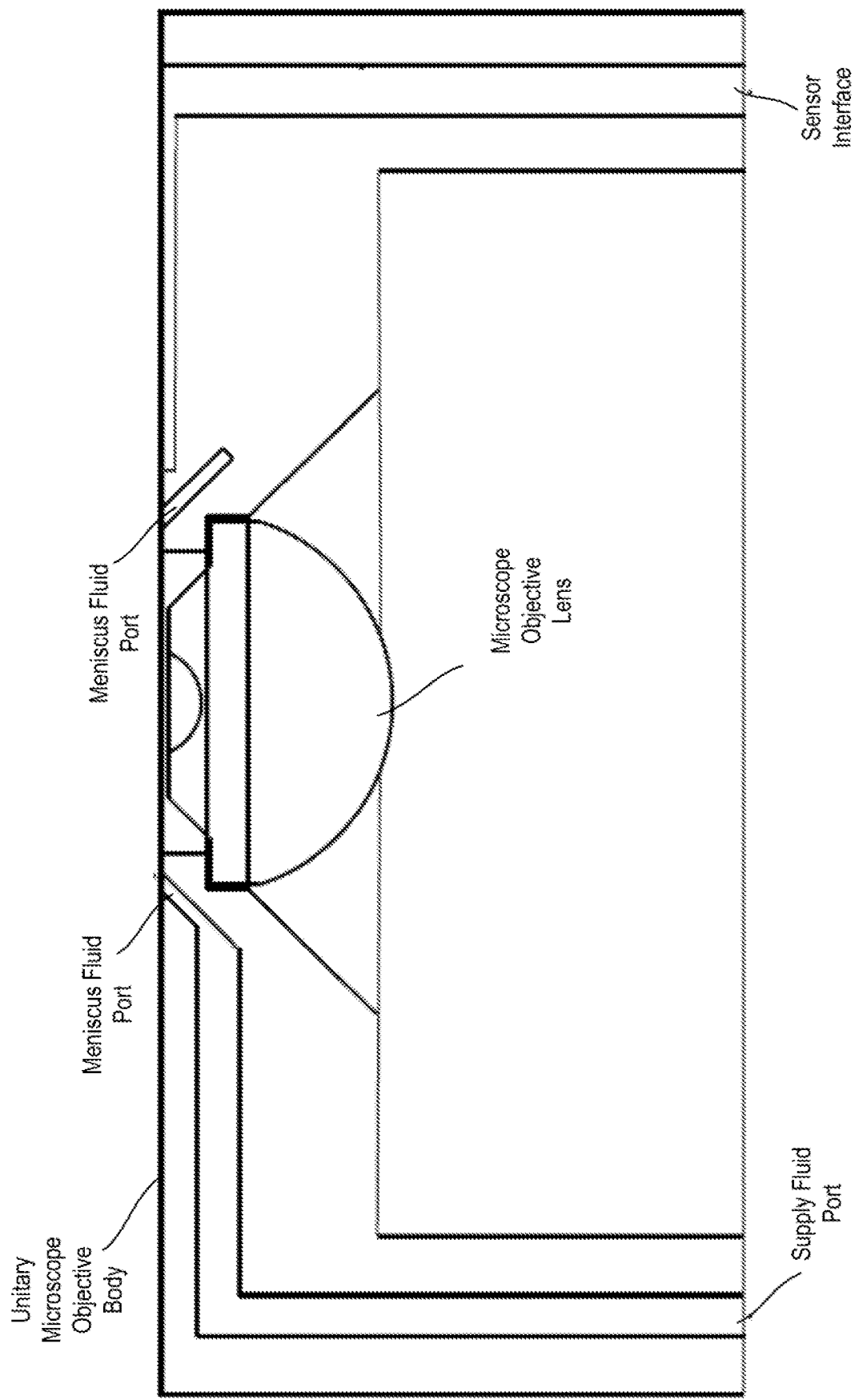
FIG. 13 depicts another embodiment in which a sensor ring is formed within a unitary microscope objective body.

Referring now to FIG. 13, another embodiment is depicted in which a sensor ring is formed within a unitary microscope objective body. In FIG. 13, a distal portion of a unitary microscope objective body is depicted. The unitary microscope objective body is formed to be a unitary, single workpiece, and may include internal channels or conduits, as depicted. The internal channels or conduits may be routed along different paths within the unitary microscope objective body. In some embodiments, the unitary microscope objective body may be formed using an additive manufacturing technique, such as 3-D printing, using any one or more of a variety of suitable materials, including metals and polymers and composite materials. As shown in FIG. 13, the unitary microscope objective body may further include optical components (such as a microscope objective lens and other elements associated with an optical path), as well as sensors for immersion control, including sensors as described previously. Accordingly, as shown, the unitary microscope objective body in FIG. 13 may include a supply fluid port that is in internal fluid communication with a meniscus fluid port that may extend, partially or wholly, circumferentially about a surface of the microscope objective lens. In addition, the unitary microscope objective body in FIG. 13 may include an internal conduit or internal conductors to connect to the sensors and/or to provide a sensor interface for the sensors for immersion control. The sensor interface may thus support the independent connection of one or more electrical contacts to the unitary microscope objective body and may enable external connection of the sensor elements to respective signal conditioning and power sources, as explained in detail above.

The unitary microscope objective body may include control circuitry coupled to the sensors and to an analytical system enabled for monitoring the sensors and detecting a condition in which it is appropriate to add more fluid and/or to cease imaging, and to provide and/or receive appropriate control signals and information. Alternatively, the unitary microscope objective body may include electrical contacts and/or data connections for easy connection to the analytical system and/or to other components, such as a computer system or display system. For example, the unitary microscope objective body may be provided with a USB port and/or a USB male plug connected to the sensors and/or control circuitry within the unitary objective body so allow both an easy connection to an analytical system for assembly, repair, or replacement, and also to a computer or display system.

Figure 14:
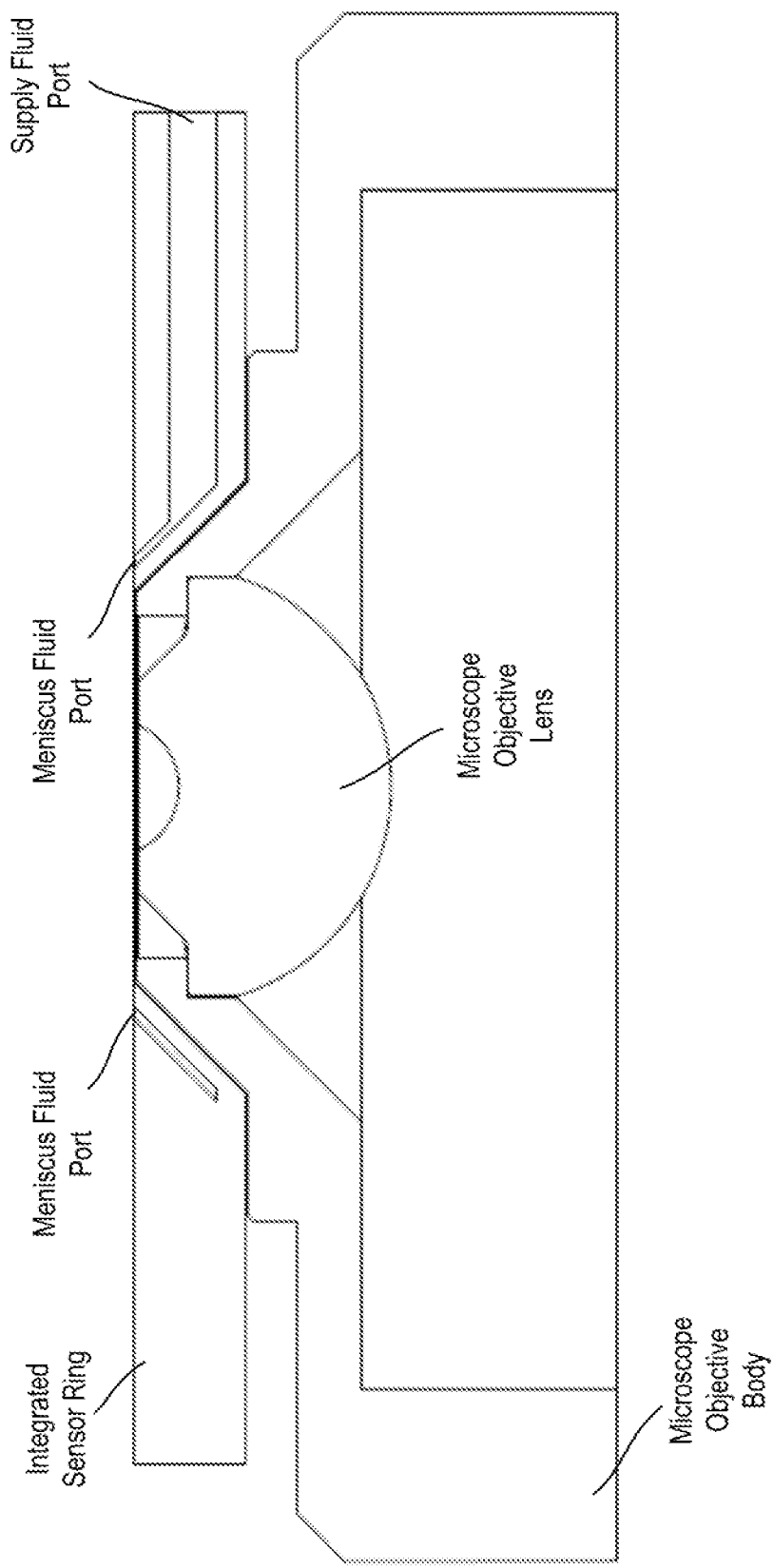
FIG. 14 depicts a further embodiment of a sensor ring.

Referring now to FIG. 14, another embodiment is depicted in which an integrated sensor ring is attached to a microscope objective body. In FIG. 14, a distal portion of a microscope objective body with the integrated sensor ring attached is depicted. The integrated sensor ring may include all elements of immersion control, as depicted, including internal channels or conduits for the fluid. The internal channels or conduits may be routed along different paths within the integrated sensor ring. As shown in FIG. 14, the fluid conduits and sensors may be entirely enclosed or embedded within the integrated sensor ring such that there is no fluid contact between the objective body and the cap due to an annular spacer of the integrated sensor ring between the fluid port and the objective body. The prevention of fluid contact with the objective body may introduce advantages over systems that include fluid contact between both, such as better fluid control, easier sealing of the integrated sensor ring the objective body together, and cleaning or maintenance benefits. In some embodiments, the conduits or internal channels may be positioned directly adjacent the objective body, such that an annular space for the fluid is formed between an inner wall of the integrated sensor ring and an outer wall of the objective body. In some embodiments, the integrated sensor ring may be formed using an additive manufacturing technique, such as 3-D printing, using any one or more of a variety of suitable materials, including metals and polymers and composite materials. As shown in FIG. 14, the integrated sensor ring may be attached to a microscope objective body in a similar manner as the sensor rings described previously herein. However, in the integrated sensor ring shown in FIG. 14, a meniscus fluid port is formed wholly within the integrated sensor ring and there is no fluid channel between the microscope objective body and the integrated sensor ring. The integrated sensor ring may further include sensors for immersion control, as described previously. Accordingly, as shown, the integrated sensor ring in FIG. 14 may include a supply fluid port that is in internal fluid communication with a meniscus fluid port that may extend, partially or wholly, circumferentially about a surface of the integrated sensor ring, and may be enabled to encircle the microscope objective lens when installed. In addition, the integrated sensor ring in FIG. 14 may include a sensor interface for the sensors for immersion control, as explained in detail above. The microscope objective body shown in FIG. 14 may have the same or similar control circuitry, and electrical and data connection features and capabilities like those described above for the unitary microscope objective body shown in FIG. 13.

Referring now to FIG. 15, another embodiment is depicted in which a modular sensor ring is enabled for installation with a modular microscope objective body. In FIG. 15, a distal portion of a modular microscope objective body is depicted. The modular sensor ring and the modular microscope objective body may be individually formed as single workpieces, or may be formed as a unitary workpiece, and may include internal channels or conduits, as depicted. The modular sensor ring and the modular microscope objective body in FIG. 15 may be enabled for assembly into a final structure that is similar to the unitary microscope objective shown in FIG. 13. However, because the modular sensor ring in FIG. 15 may be removable, the modular sensor ring can be easily replaced during use, such as for servicing, repairing, or to extend a service life of the modular microscope objective for immersion microscopy. The modular sensor ring in FIG. 15 includes an integrated fluidic pathway within the objective body with a connected path in the modular sensor ring to a sensor plate for detection of a meniscus. The fluid port of FIG. 15, at a terminal end, is separated from the objective body by a spacer piece similar to that of FIG. 14, described above. In some embodiments, the spacer ring between the fluid port and the objective body may be removed or not present, enabling contact between the fluid and the objective body, with the modular sensor ring and the objective body forming the meniscus fluid port in the annular space. In some embodiments, the modular sensor ring and the modular microscope objective body may be formed using an additive manufacturing technique, such as 3-D printing, using any one or more of a variety of suitable materials, including metals and polymers and composite materials. The microscope objective body shown in FIG. 15 may have the same or similar control circuitry, and electrical and data connection features and capabilities like those described above for the unitary microscope objective body shown in FIG. 13.

As disclosed herein, a fluid immersion control system may use a common electrode along with a plurality of sensor electrodes at a planar surface associated with a distal end of an immersion microscope objective to monitor electrical resistance of a fluid as an indication of presence of a fluid layer having a meniscus greater than a diameter of an optical axis used for immersion microscopy. The fluid immersion control system may activate replenishment of the fluid when the resistance indicates that the diameter is not immersed in the fluid.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A control system for fluid immersion for inverted microscopy, the control system comprising:
    a sensor ring coupled to a distal portion of a microscope lens used with an inverted microscope, wherein the sensor ring forms an annulus in fluid communication with the microscope lens, wherein the annulus is enabled to convey a fluid that forms an immersion layer at a surface of the microscope lens during imaging using the microscope lens, and wherein the sensor ring further comprises:
        a plurality of sensor electrodes located circumferentially about the annulus, wherein each of the plurality of sensor electrodes remains in contact with the fluid when the fluid immerses the microscope lens;
        a common electrode located within the annulus, wherein the common electrode remains in fluid communication with the fluid; and
        a fluid port to receive additional fluid to replenish the immersion layer;
    a fluid replenishment system coupled to the fluid port and enabled to provide the additional fluid;
    an immersion controller coupled to the plurality of sensor electrodes, the common electrode, and the fluid replenishment system, the immersion controller enabled for:
        when the fluid immerses the microscope lens, measuring a first resistance of the fluid, respectively, between each of the plurality of sensor electrodes and the common electrode, to detect the fluid at each respective sensor electrode of the plurality of sensor electrodes;
        when the fluid exposes a first sensor electrode included in the plurality of sensor electrodes, measuring a second resistance of an air gap at the first sensor electrode; and
        responsive to detecting the air gap, controlling the fluid replenishment system to provide the additional fluid.

2. The control system of claim 1, wherein the fluid replenishment system further comprises:
    a reservoir enabled to store a volume of the additional fluid; and
    a pump in fluid communication with the reservoir and the fluid port.

3. The control system of claim 1, wherein controlling the fluid replenishment system to provide the additional fluid further comprises:
    providing the additional fluid until the first resistance is respectively measured from each of the plurality of sensor electrodes.

4. The control system of claim 1, wherein the sensor ring and the distal portion of the microscope lens form a planar surface, wherein the distal portion of the microscope lens and the plurality of sensor electrodes are at the same height.

5. The control system of claim 1, wherein the plurality of sensor electrodes includes at least three sensor electrodes.

6. The control system of claim 1, further comprising:
    a sensor interface enabled to couple the immersion controller to the plurality of sensor electrodes and the common electrode, wherein the sensor interface further comprises:
        a current source enabled to form a circuit between the common electrode and the plurality of sensor electrodes; and
        a signal conditioning unit enabled to generate a plurality of voltage signals respectively from the plurality of sensor electrodes.

7. The control system of claim 6, wherein the immersion controller enabled for measuring the first resistance and the second resistance further comprises the immersion controller enabled for:
    receiving the plurality of voltage signals; and
    generating a plurality of digital voltage values corresponding to the plurality of voltage signals.

8. The control system of claim 7, wherein the immersion controller further comprises:
    a plurality of analog-to-digital converters respectively receiving the plurality of voltage signals to generate the plurality of digital voltage values.

9. The control system of claim 7, wherein the immersion controller further comprises:
    a multiplexer enabled to receive the plurality of voltage signals; and
    an analog-to-digital converter to generate the digital voltage values from an output of the multiplexer.

10. The control system of claim 9, wherein the multiplexer includes sample-and-hold circuitry.

11. The control system of claim 1, wherein the microscope lens is located in proximity to a transparent sample plate, and wherein the fluid forms a meniscus between the transparent sample plate and the sensor ring surrounded by the distal end of the microscope lens.

12. The control system of claim 11, wherein the inverted microscope is enabled for imaging different samples on the transparent sample plate by moving at least one of the transparent sample plate and the microscope lens with respect to each other.

13. The control system of claim 12, wherein the transparent sample plate and the microscope lens are enabled to move with respect to each other in a plane perpendicular to an optical axis of the microscope lens.

14. The control system of claim 12, wherein the immersion controller is enabled to maintain a first diameter of the meniscus that is greater than a second diameter of the microscope lens, wherein the second diameter corresponds to an optical axis of the microscope lens.

15. The control system of claim 14, wherein the immersion controller is enabled to maintain the first diameter of the meniscus when the transparent sample plate and the microscope lens move with respect to each other.

16. The control system of claim 14, wherein the plurality of sensor electrodes located circumferentially about the annulus defines the first diameter.

17. A microscope objective for fluid immersion for inverted microscopy, the microscope objective comprising:
a sensor ring coupled to a distal portion of a microscope objective used with an inverted microscope, wherein the sensor ring forms an annulus in fluid communication with the microscope objective, wherein the annulus is enabled to convey a fluid that forms an immersion layer at a surface of the microscope objective during imaging using the microscope objective, and wherein the sensor ring further comprises:
a plurality of sensor electrodes located circumferentially about the annulus, wherein each of the plurality of sensor electrodes remains in contact with the immersion layer when the fluid immerses the microscope objective;
a common electrode located within the annulus, wherein the common electrode remains in fluid communication with the fluid; and
a fluid port to receive additional fluid to replenish the immersion layer;
wherein the microscope objective is enabled to operate with:
a fluid replenishment system coupled to the fluid port and enabled to provide the additional fluid;
an immersion controller coupled to the plurality of sensor electrodes, the common electrode, and the fluid replenishment system, the immersion controller enabled for:
when the fluid immerses the microscope objective, measuring a first resistance of the fluid, respectively, between each of the plurality of sensor electrodes and the common electrode, to detect the fluid at each respective sensor electrode of the plurality of sensor electrodes;
when the fluid exposes a first sensor electrode included in the plurality of sensor electrodes, measuring a second resistance of an air gap at the first sensor electrode; and
responsive to detecting the air gap, controlling the fluid replenishment system to provide the additional fluid.

18. The microscope objective of claim 17, further comprising:

a sensor interface enabled to couple the immersion controller to the plurality of sensor electrodes and the common electrode.

19. The microscope objective of claim 17, wherein the fluid replenishment system further comprises:
a reservoir enabled to store a volume of the additional fluid; and
a pump in fluid communication with the reservoir and the fluid port.

20. The microscope objective of claim 17, wherein controlling the fluid replenishment system to provide the additional fluid further comprises:
providing the additional fluid until the first resistance is respectively measured from each of the plurality of sensor electrodes.

21. The microscope objective of claim 17, wherein the sensor ring and the distal portion of the microscope objective form a planar surface, wherein the distal portion of the microscope objective and the plurality of sensor electrodes are at the same height.

22. The microscope objective of claim 17, wherein the plurality of sensor electrodes includes at least three sensor electrodes.

23. The microscope objective of claim 17, wherein the microscope objective is located in proximity to a transparent sample plate, and wherein the fluid forms a meniscus between the transparent sample plate and the sensor ring.

24. The microscope objective of claim 23, wherein the inverted microscope is enabled for imaging different samples on the transparent sample plate by moving at least one of the transparent sample plate and the microscope objective with respect to each other.

25. The microscope objective of claim 24, wherein the transparent sample plate and the microscope objective are enabled to move with respect to each other in a plane perpendicular to an optical axis of the microscope objective.

26. The microscope objective of claim 24, wherein the immersion controller is enabled to maintain a first diameter of the meniscus that is greater than a second diameter of the microscope objective.

27. The microscope objective of claim 26, wherein the immersion controller is enabled to maintain the first diameter of the meniscus when the transparent sample plate and the microscope objective move with respect to each other.

28. The microscope objective of claim 26, wherein the plurality of sensor electrodes located circumferentially about the annulus defines the first diameter.

29. A method for inverted immersion microscopy, the method comprising:
using a microscope objective to view a first sample included in a plurality of samples loaded into an inverted microscope, wherein the microscope objective is immersed in a fluid at a distal portion of the microscope objective, wherein the microscope objective further comprises:
a sensor ring coupled to the distal portion and forming an annulus in fluid communication with the microscope objective, wherein the annulus is enabled to convey the fluid, and wherein the sensor ring further comprises:
a plurality of sensor electrodes located circumferentially about the annulus, wherein each of the plurality of sensor electrodes remains in contact with the fluid when the fluid immerses the microscope objective;
a common electrode located within the annulus, wherein the common electrode remains in fluid communication with the fluid; and a fluid port to receive additional fluid from a fluid replenishment system to replenish the fluid; and using an immersion controller coupled to the plurality of sensor electrodes, the common electrode, and the fluid replenishment system, maintaining the fluid over an optical axis diameter of the distal portion when at least one of the microscope objective and the first sample are moved with respect to each other.

30. The method of claim 29, wherein maintaining the fluid over the optical axis diameter of the distal portion further comprises:

when the fluid immerses the microscope objective, measuring a first resistance of the fluid, respectively, between each of the plurality of sensor electrodes and the common electrode, to detect the fluid at each respective sensor electrode of the plurality of sensor electrodes;

when the fluid exposes a first sensor electrode included in the plurality of sensor electrodes, measuring a second resistance of an air gap at the first sensor electrode; and responsive to detecting the air gap, controlling the fluid replenishment system to provide the additional fluid.

31. The method of claim 29, further comprising:

causing at least one of the microscope objective and the first sample to be moved with respect to each other in order to view a second sample included with the plurality of samples using the microscope objective; and wherein maintaining the fluid over the optical axis diameter of the distal portion further comprises maintaining the fluid over the optical axis diameter before the microscope objective is aligned with the second sample.

\* \* \* \* \*